ated July 26, 1966

3,262,944
CERTAIN 2,3-BENZO-1,3a,6a-TRIAZAPENTALENE
COMPOUNDS
Robert J. Harder and James C. Kauer, Wilmington, Del.,
assignors to E. I. du Pont de Nemours and Company,
Wilmington, Del., a corporation of Delaware
No Drawing. Filed Nov. 7, 1963, Ser. No. 322,076
7 Claims. (Cl. 260—308)

This invention relates to new polynuclear organic nitrogen compounds. More particularly, it relates to new triazapentalenes and substituted triazapentalenes.

A few compounds are known which can be classed as triazapentalenes, i.e., dehydroheterobicyclo[3.3.0] octanes having three nitrogen atoms in the ring system. However, none are disclosed in a state of lowest hydrogenation which would require representation by means of a dipolar resonance hybrid structural formula.

The new compounds of this invention are benzotriazapentalenes, specifically 2,3-benzo-1,3a,6a-triazapentalenes and derivatives thereof have halogen, amino, nitro, cyano, tricyanovinyl or aryl substituents. These compounds are represented by the structural formula

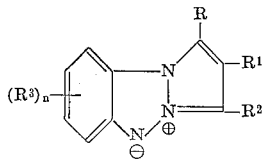

wherein R and $R^2$ are hydrogen, halogen (fluorine, chlorine, bromine or iodine), nitro (—$NO_2$), cyano (—CN), amino (—$NH_2$), aryl or tricyanovinyl

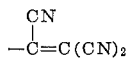

$R^1$ is hydrogen, halogen, cyano, or aryl; $R^3$ is halogen, nitro, or amino; and $n$ is a cardinal number in the range 0–2 (i.e., 0, 1 or 2).

Preferred compounds of the foregoing class are those wherein $n$ is 0, R and $R^2$ are hydrogen or tricyanovinyl, and $R^1$ is hydrogen or halogen. Aryl R, $R^1$ and $R^2$ substituents are preferably carbocyclic aryl groups containing from 6 to 12 carbon atoms, inclusive.

The 2,3-benzo-1,3a,6a-triazapentalenes defined above are thermally stable solid materials which are soluble in ordinary solvents. Chemically they have aromatic properties. They are in a state of lowest hydrogenation which can be represented satisfactorily in structural formulas only by means of dipolar (mesoionic) structures as in the preceding definition, or by means of a pictorialized charge distribution, e.g. (for 2,3-benzo-1,3a,6a-triazapentalene):

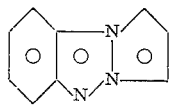

The aromaticity derived from this resonance stabilized mesoionic structure provides ring stability in the presence of strong electrophilic agents such as the halogens or nitric acid. Hydrogens on both the benzene and pyrazole ring segments of the 2,3-benzo-1,3a,6a-triazapentalenes can be replaced by means of such electrophilic substitution reagents, and as many as four substituents can be so introduced. With the more usual reagents mentioned above, the pyrazole ring is considered the more likely site of initial attack. With tetracyanoethylene as the electrophilic reactant, hydrogens on the pyrazole ring at the R and $R^2$ positions are known to be the ones most readily replaced by tricyanovinyl groups.

The 2,3-benzo-1,3a,6a-triazapentalenes can be obtained from 1-(o-nitrophenyl)pyrazoles by the ring closure reaction described in copending, coassigned patent application Serial No. 322,033 to James C. Kauer filed concurrently herewith. This process involves the use of a tertiary phosphite or phosphine as the ring closing reagent. It can be used to prepare the parent compound, 2,3-benzo-1,3a, 6a-triazapentalene, and substituted derivatives thereof by starting with appropriately substituted 1-(o-nitropehyl)-pyrazoles. Additional substituted derivatives within the scope of this invention are prepared from preformed 2,3-benzo-1,3a,6a-triazapentalenes by substitution with electrophilic reagents, e.g., the halogens, nitric acid, or tetracyanoethylene. Amino derivatives are readily obtained by reduction of the nitro-substituted compounds.

The following examples further illustrate the preparation and properties of the new compounds of this invention.

Example I.—2,3-benzo-1,3a,6a-triazapentalene

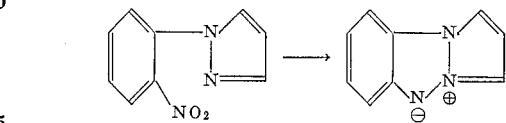

A solution of 37.8 g. (0.20 g. mole) of 1-(o-nitrophenyl)pyrazole [Dal Monte et al., Gazz. chim. Ital. 86, 797 (1956)] and 160 ml. (excess) of triethyl phosphite in 400 ml. of xylene was refluxed under nitrogen for 13.5 hours. The solution was reduced in volume by distilling off volatiles at 0.25 mm. until a head temperature of 45° C. was reached. The residue deposited crystals on standing at room temperature. The solid product (2.3 g.) was separated by filtration and recrystallized from cyclohexane. The tan product, M.P. 103.5–104° C., became darker in color on exposure to light. It was identified as 2,3-benzo-1,3a,6a-triazapentalene (alternatively named 1,5-didehydro-1H,5H-pyrazolo[1,2-a]benzotriazole).

Analysis for $C_9H_7N_3$.—Calc'd: C, 68.8; H, 4.49; N, 26.7; Mol. weight, 157. Found: C, 68.8; H, 4.72; N, 26.8; Mol. weight, 158, 159.

Example II.—2,3,benzo-5-chloro-1,3a,6a-triazapentalene

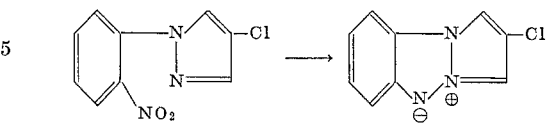

A solution of 4.46 g. (0.02 g. mole) of 1-(o-nitrophenyl)-4-chloropyrazole and 16 ml. of triethyl phosphite in 50 ml. of xylene was refluxed under nitrogen for 7.5 hours. During this time the color changed from bright yellow to dark brown. Triethyl phosphate and triethyl phosphite were removed from the reaction mixture at 100° C. under 0.5 mm. pressure. The residue, on standing overnight at room temperature, deposited a crystalline product which was separated by filtration and recrystallized from ether. The light tan recrystallized product, M.P. 162–163° C., was identified as 2,3-benzo-5-chloro-1,3a,6a-triazapentalene (alternatively named 2-chloro-1,5-didehydro-1H,5H-pyrazolo-[1,2-a]benzotriazole).

Analysis for $C_9H_6ClN_3$.—Calc'd: C, 56.4; H, 3.16; N, 18.5; Cl, 21.9; mol. wt. 192. Found: C, 56.7; H, 3.37; N, 18.5; Cl, 21.8; Mol. wt., 192.

The 1-(o-nitrophenyl)-4-chloropyrazole was prepared in the following manner: A mixture of 6.53 g. (0.064 g. mole) of 4-chloropyrazole, 8.72 g. (0.062 g. mole) of o-fluoronitrobenzene, 6.36 g. (0.064 g. mole) of sodium carbonate and 30 ml. of dimethylformamide was refluxed for 12 hours under nitrogen at atmospheric pressure. The reaction mixture was poured into ice water, and a yellow crystalline precipitate was formed. Recrystallization of the product from aqueous ethanol gave 11.5 g. (82%) of light yellow crystals, M.P. 65–66° C. The product was identified as 1-(o-nitrophenyl)-4-chloropyrazole.

Analysis for $C_9H_6ClN_3O_2$.—Calc'd: C, 48.3; H, 2.70; Cl, 15.9; N, 18.8. Found: C, 48.7; H, 2.78; Cl, 15.9; N, 18.7.

*Example III.—2,3-benzo-5-bromo-1,3a,6a-triazapentalene*

A mixture of 26.8 g. (0.10 g. mole) of 1-(o-nitrophenyl)-5-bromopyrazole, 60 ml. (58 g., 0.35 g. mole) of freshly distilled triethyl phosphite and 100 ml. of xylene was refluxed for 12 hours under nitrogen with exclusion of light. The mixture was then distilled at 1 mm. pressure until the head temperature reached 40° C. The crystals which formed on cooling the residue were removed, washed with ether and recrystallized from ether to yield 2.1 g. of 2,3-benzo-5-bromo-1,3a,6a-triazapentalene, M.P. 168,170° C. Reduction of the volume of the filtrate gave an additional 1.1 g. of the pentalene. Recrystallization once more from ether gave purified product, M.P. 169–170° C.

Analysis for $C_9H_6BrN_3$.—Calc'd: C, 45.8; H, 2.6; Br, 33.8. Found: C, 45.6; H, 2.7; Br, 34.0.

*Example IV.—Tricyanovinyl-2,3-benzo-5-chloro-1,3a,6a-triazapentalene*

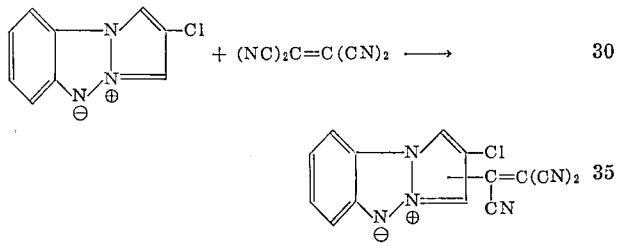

To a solution of 0.48 g. (0.0025 g. mole) of the 2,3-benzo-5-chloro-1,3a,6a-triazapentalene in 25 ml. of purified dimethylformamide was added 0.32 g. (0.0025 g. mole) of tetracyanoethylene dissolved in 25 ml. of dimethylformamide. The solution turned green, then purple. After standing 16 hours at room temperature the reaction mixture was treated with water and the resulting purple precipitate was collected on the filter, washed with water, and dried. The purple solid dissolved readily in acetone.

Variously substituted 2,3-benzo-1,3a,6a-triazapentalenes can be prepared by procedures illustrated in the foregoing examples. Thus, substituted 1-(o-nitrophenyl)-pyrazoles yield substituted benzotriazapentalenes of this invention by application of the ring closure reaction illustrated in Examples I to III. Alternatively, electronegative substituents can be introduced by reaction of electrophilic reagents on 2,3-benzo-1,3a,6a-triazapentalene itself or on partially substituted 2,3-benzo-1,3a,6a-triazapentalenes as shown in Examples IV and V.

*Example V.—Nitration of 2,3-benzo-5-chloro-1,3a,6a-triazapentalene*

A solution of 0.96 g. (0.0025 g. mole) of 2,3-benzo-5-chloro-1,3a,6a-triazapentalene in 10 ml. of concentrated sulfuric acid was treated dropwise, with cooling, with 1.01 g. (0.010 g. mole) of potassium nitrate in 10 ml. of concentrated sulfuric acid. The solid which separated was removed, washed with water, and air-dried. Elemental analysis corresponds most closely to that of a tetranitro derivative.

Analysis for $C_9H_2ClN_7O_8$.—Calc'd: C, 29.0; H, 0.05; Cl, 9.5; N, 26.4. Found: C, 27.9; H, 1.00; Cl, 9.0; N, 21.3.

Table I presents 2,3-benzo-1,3a,6a-triazapentalenes of this invention having representative combinations of R, $R^1$ and $R^2$ substituents, $n$ being 0, all of which can be obtained from corresponding 1-(o-nitrophenyl)pyrazoles in the manner illustrated in foregoing Examples I to III.

TABLE I

| Name of compound | R | $R^1$ | $R^2$ |
|---|---|---|---|
| 2,3-benzo-5-fluoro-1,3a,6a-triazapentalene. | H | F | H |
| 2,3-benzo-5-bromo-1,3a,6a-triazapentalene. | H | Br | H |
| 2,3-benzo-5-cyano-1,3a,6a-triazapentalene. | H | CN | H |
| 2,3-benzo-5-(p-phenylphenyl)-1,3a,6a-triazapentalene. | H | $C_6H_4-C_6H_5$ | H |
| 2,3-benzo-4-chloro-1,3a,6a-triazapentalene. | Cl | H | H |
| 2,3-benzo-4-fluoro-1,3a,6a-triazapentalene. | F | H | H |
| 2,3-benzo-4-(β-naphthyl)-1,3a,6a-triazapentalene. | $C_{10}H_7$ | H | H |
| 2,3-benzo-4-cyano-1,3a,6a-triazapentalene. | CN | H | H |
| 2,3-benzo-6-bromo-1,3a,6a-triazapentalene. | H | H | Br |
| 2,3-benzo-6-iodo-1,3a,6a-triazapentalene. | H | H | I |
| 2,3-benzo-6-phenyl-1,3a,6a-triazapentalene. | H | H | $C_6H_5$ |
| 2,3-benzo-6-cyano-1,3a,6a-triazapentalene. | H | H | CN |
| 2,3-benzo-4,5-dichloro-1,3a,6a-triazapentalene. | Cl | Cl | H |
| 2,3-benzo-4-chloro-5-bromo-1,3a,6a-triazapentalene. | Cl | Br | H |
| 2,3-benzo-5-iodo-1,3a,6a-triazapentalene. | H | I | H |
| 2,3-benzo-5,6-dibromo-1,3a,6a-triazapentalene. | H | Br | Br |
| 2,3-benzo-4-phenyl-5-cyano-1,3a,6a-triazapentalene. | $C_6H_5$ | CN | H |
| 2,3-benzo-5-cyano-6-phenyl-1,3a,6a-triazapentalene. | H | CN | $C_6H_5$ |
| 2,3-benzo-bis(4,5-phenyl)-1,3a,6a-triazapentalene. | $C_6H_5$ | $C_6H_5$ | H |
| 2,3-benzo-4-(p-tolyl)-1,3a,6a-triazapentalene. | p-$C_6H_4CH_3$ | H | H |

Table II lists compounds, not specified in Table I, which can be obtained by substitution reactions (illustrated in Example V) on unsubstituted 2,3-benzo-1,3a,6a-triazapentalene or on compounds given in Table I; or which can be obtained from appropriate substituted compounds by simple transformations, e.g., by reduction of nitro derivatives.

TABLE II

| Name of Compound | R | $R^1$ | $R^2$ | n | $R^3$ |
|---|---|---|---|---|---|
| 2,3-benzo-6-fluoro-1,3a,6a-triazapentalene. | H | H | F | 0 | |
| 2,3-(nitrobenzo)-4,6-dinitro-1,3a,6a-triazapentalene. | $NO_2$ | H | $NO_2$ | 1 | $NO_2$ |
| 2,3-(dinitrobenzo)-4,6-dinitro-1,3a,6a-triazapentalene. | $NO_2$ | H | $NO_2$ | 2 | $NO_2$ |
| 2,3-(nitrobenzo)-5-chloro-4,6-dinitro-1,3a,6a-triazapentalene. | NO | Cl | $NO_2$ | 1 | $NO_2$ |
| 2,3-(dinitrobenzo)-5-chloro-4,6-dinitro-1,3a,6a-triazapentalene. | $NO_2$ | Cl | $NO_2$ | 2 | $NO_2$ |
| 2,3-(chlorobenzo)-4,6-dichloro-1,3a,6a-triazapentalene. | Cl | H | Cl | 1 | Cl |
| 2,3-(bromobenzo)-4,6-dibromo-5-chloro-1,3a,6a-triazapentalene. | Br | Cl | Br | 1 | Br |
| 2,3-benzo-6-amino-1,3a,6a-triazapentalene. | H | H | $NH_2$ | 0 | |
| 2,3-(aminobenzo)-4,6-diamino-1,3a,6a-triazapentalene. | $NH_2$ | H | $NH_2$ | 1 | $NH_2$ |

The products of this invention are useful as light-activated print-out materials. For example, paper impregnated with 2,3-benzo-1,3a,6a-triazapentalene or 2,3-benzo-5-chloro-1,3a,6a-triazapentalene was exposed briefly under a perforated mask to the radiation of a sunlamp. The exposed paper showed the pattern of the mask in darker color matching the perforated areas. Likewise, paper impregnated with tricyanovinyl-2,3-benzo-5-chloro-1,3a,6a-triazapentalene was exposed to a sunlamp through a mask, and the mask pattern was reproduced in lighter color matching the perforated areas.

As many widely different embodiments of this invention may be made without departing from the spirit and scope thereof, it is to be understood that this invention The embodiments of the invention in which an exclusive property or privilege is claimed are defined as follows:

1. 2,3-benzo-1,3a,6a-triazapentalenes of the formula

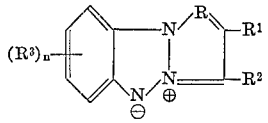

wherein R and R² each is selected from the group consisting of hydrogen, halogen, nitro, cyano, amino, aryl, and tricyanovinyl, R¹ is selected from the group consisting of hydrogen, halogen, cyano, and aryl, R³ is selected from the group consisting of halogen, nitro, and amino, and $n$ is a cardinal number in the range zero to two, inclusive.

2. A compound defined in claim 1 wherein R and R² each is hydrogen, R¹ is halogen, and $n$ is zero.

3. A compound defined in claim 1 wherein R and R² each is tricyanovinyl, R¹ is hydrogen, and $n$ is zero.

4. A compound defined in claim 1 wherein R and R² each is tricyanovinyl, R¹ is halogen, and $n$ is zero.

5. 2,3-benzo-1,3a,6a-triazapentalene.

6. 2,3-benzo-5-chloro-1,3a,6a-triazapentalene.

7. Tricyanovinyl-2,3 - benzo-5-chloro - 1,3a,6a - triazapentalene.

No references cited.

HENRY R. JILES, *Acting Primary Examiner.*

A. D. ROLLINS, *Assistant Examiner.*